United States Patent
Leleannec et al.

(10) Patent No.: US 11,122,296 B2
(45) Date of Patent: Sep. 14, 2021

(54) BLOCK SIZED BASED TRANSFORM RESTRICTIONS

(71) Applicant: INTERDIGITAL VC HOLDINGS, INC., Wilmington, DE (US)

(72) Inventors: Fabrice Leleannec, Cesson-Sevigne (FR); Franck Galpin, Cesson-Sevigne (FR); Tangi Poirier, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/477,021

(22) PCT Filed: Jan. 5, 2018

(86) PCT No.: PCT/EP2018/050295
§ 371 (c)(1),
(2) Date: Jul. 10, 2019

(87) PCT Pub. No.: WO2018/130473
PCT Pub. Date: Jul. 19, 2018

(65) Prior Publication Data
US 2020/0007893 A1    Jan. 2, 2020

(30) Foreign Application Priority Data
Jan. 11, 2017 (EP) ...................................... 17305036

(51) Int. Cl.
*H04N 19/61* (2014.01)
*H04N 19/105* (2014.01)
(Continued)

(52) U.S. Cl.
CPC ........... *H04N 19/61* (2014.11); *H04N 19/105* (2014.11); *H04N 19/119* (2014.11); *H04N 19/13* (2014.11); *H04N 19/176* (2014.11)

(58) Field of Classification Search
CPC combination set(s) only.
See application file for complete search history.

(56) References Cited

U.S. PATENT DOCUMENTS

2018/0199072 A1* 7/2018 Li ........................ H04N 19/122

OTHER PUBLICATIONS

Yuan et al., Quadtree Based Nonsquare Block Structure for Inter Frame Coding in High Efficiency Video Coding, IEEE Transactions on Circuits and Systems for Video Technology, vol. 22, No. 12, Dec. 2012, pp. 1707- 1719.
(Continued)

*Primary Examiner* — Jeffery A Williams
(74) *Attorney, Agent, or Firm* — Ronald Kolczynski

(57) ABSTRACT

A coding unit having a size multiple of three in horizontal or vertical direction is coded through one of several embodiments. In one embodiment, for some block sizes, the coding unit is coded and decoded systematically through SKIP mode. In another embodiment, the coding units can be coded in SKIP mode or with a DC coefficient. In another embodiment, an asymmetric division of a common coding unit parent is performed and transform coefficients are factorized among at least two sub-blocks to encode a coding unit. In another embodiment, a separable two dimensional transform can be applied by applying a transform over the block in one direction, and using two one-dimensional transforms on sub-blocks in the other direction to code. Methods, apparatus, and signal embodiments are provided for encoding and decoding.

21 Claims, 14 Drawing Sheets

(51) Int. Cl.
  *H04N 19/119* (2014.01)
  *H04N 19/13* (2014.01)
  *H04N 19/176* (2014.01)

(56) References Cited

OTHER PUBLICATIONS

Zhang et al., Complexity Controllable DCT for Real-Time H.264 Encoder, J. Vis. Commun. Image R., 18 (2007). pp. 59-67.
Zheng, Implicit Transform Block Split Process for Asymmetric Partitions, Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, pp. 1-4.
Pao et al, Computation Reduction for Discrete Cosine Transform, Circuits and Systems, 1998, ISCAS '98, Proceedings of the 1998 IEEE International Symposium on Monterey, CA, May 31-Jun. 3, 1998, vol. 4, pp. 285-288.
Mrak et al., Transform Skip Mode, 7, JCT-VC Meeting, 98, MPEG Meeting, Nov. 21, 2011-Nov. 30, 2011, Geneva, (Joint Collaborative Team on Video Coding of ISO/IEC JTC1/SC29/WG11 and ITU-T SG.16), URL:http://wftp3.itu.int/av-arch/jctvc-site/, No. JCTVC-G575, Nov. 8, 2011.

* cited by examiner

HOR_UP   HOR_DOWN   VER_LEFT   VER_RIGHT

BLOCK SIZED BASED TRANSFORM RESTRICTIONS

FIELD OF THE INVENTION

The present principles relate to the field of video compression.

BACKGROUND OF THE INVENTION

In the HEVC video compression standard, a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters, also referred to as Prediction Information or prediction info. To do so, it is spatially partitioned into one or more Prediction Units (PUs), each PU being assigned some prediction information. The Intra or Inter coding mode is assigned on the CU level, as in the example of FIG. 2.

The Partitioning of a Coding Unit into Prediction Unit(s) is done according to the partition type, signaled in the bit-stream. For an Intra coding unit, only the partition types 2N×2N and N×N, illustrated on FIG. 3, are used. This means only square Prediction Units are used in Intra Coding Units.

On the contrary, Inter Coding Units can use all partition types shown on FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain as a proposed way to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit can be decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divided in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into prediction units or transform units is employed. In other words, each Coding Unit is systematically made of a single prediction unit (previously 2N×2N prediction unit partition type) and single transform unit (no division into a transform tree).

However, further improved compression efficiency is needed compared to QTBT technology.

SUMMARY OF THE INVENTION

These and other drawbacks and disadvantages of the prior art are addressed by at least one of the described embodiments, which are directed to a method and apparatus for coding or decoding a block of video data. In at least one embodiment, the block of video data is divided into sub-blocks, at least one of which has a size that is not a power of two in height or width.

According to at least one general embodiment described herein, there is provided a method for coding a block of video data. The method comprises dividing said block into at least two rectangular sub-blocks; encoding a sub-block having size that is not a power-of-two in width or height, using processing such that a transform that is not a power-of-two is not needed.

According to another general embodiment described herein, there is provided an apparatus for coding a block of video data, comprising: a memory, and a processor, configured to: divide said block into at least two rectangular sub-blocks, and encode a sub-block having size that is not a power-of-two in width or height, using processing such that a transform that is not a power-of-two is not needed.

According to another general aspect described herein, there is provided either of the above two embodiments wherein, said processing comprises, or said processor is further configured for: obtaining residuals for the at least two sub-blocks using at least two corresponding predictor sub-blocks; dividing one sub-block of said at least two sub-blocks into at least two smaller sub-blocks; calculating a single DC coefficient for said one sub-block of said at least two sub-blocks; transforming each of said smaller sub-blocks using power-of-two sized transforms to generate transform coefficients after subtracting a reconstructed version of said single DC coefficient from each said smaller sub-block, wherein said single DC coefficient is included in the transform coefficients of one of said smaller sub-blocks.

According to another embodiment described herein, there is provided a method for decoding a block of video data, comprising: decoding a sub-block having size that is not a power-of-two in width or height, using processing such that an inverse transform that is not a power-of-two is not needed, wherein said sub-block was divided from said block into at least two rectangular sub-blocks.

According to another embodiment described herein, there is provided an apparatus for coding a block of video data, comprising: a memory, and a processor, configured to: decode a sub-block having size that is not a power-of-two in width or height, using processing such that an inverse transform that is not a power-of-two is not needed, wherein said sub-block was divided from said block into at least two rectangular sub-blocks.

According to another general aspect described herein, there is provided either of the aforementioned two embodiments wherein, said processing comprises, or said processor is further configured for: obtaining a DC coefficient of a sub-block having size that is not a power-of-two in width or height by entropy decoding a transform coefficient associated to a first smaller sub-block that comprises said sub-block; reconstructing a low pass component of said sub-block using an inverse transform applied on said DC coefficient; applying a partial inverse transform of said first smaller sub-block by applying an inverse transform on AC coefficients of the first smaller sub-block and considering a DC coefficient equal to zero; entropy decoding an AC coefficient associated to a second smaller sub-block of said sub-block; partially inverse transforming said second smaller sub-block by applying an inverse transform on the AC coefficients of said second smaller sub-block and considering a DC coefficient equal to zero.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

DETAILED DESCRIPTION

An approach is described for improved compression efficiency and reduced complexity in video compression.

In this description, a way of coding the Coding Units is proposed for Coding Units having a size multiple of 3 in horizontal or vertical direction, such that it is not needed to apply a transform with a size multiple of 3.

Thus, at least one embodiment allows using Asymmetric Coding Units, while avoiding introducing new transform sizes in the codec design of a prior art method.

In the HEVC video compression standard, a picture is divided into so-called Coding Tree Units (CTU), which size is typically 64×64, 128×128, or 256×256 pixels.

Figure 1:
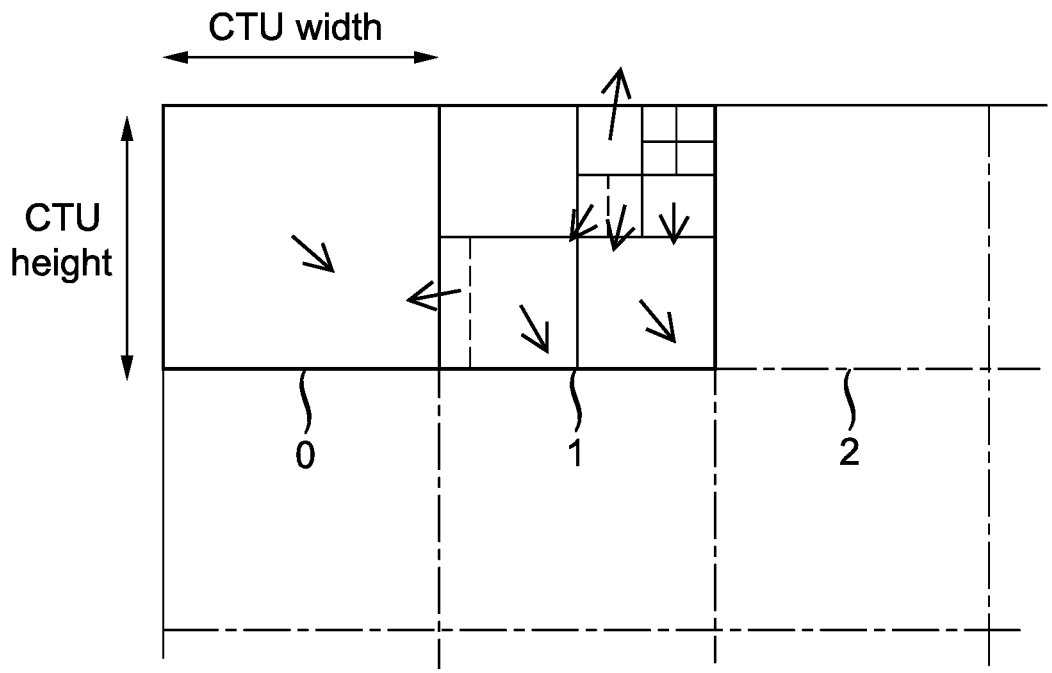
FIG. 1 shows one example of a coding tree unit and coding tree concepts to represent a compressed picture.

Each CTU is represented by a Coding Tree in the compressed domain. This is a quad-tree division of the CTU, where each leaf is called a Coding Unit (CU), see FIG. 1.

Figure 2:
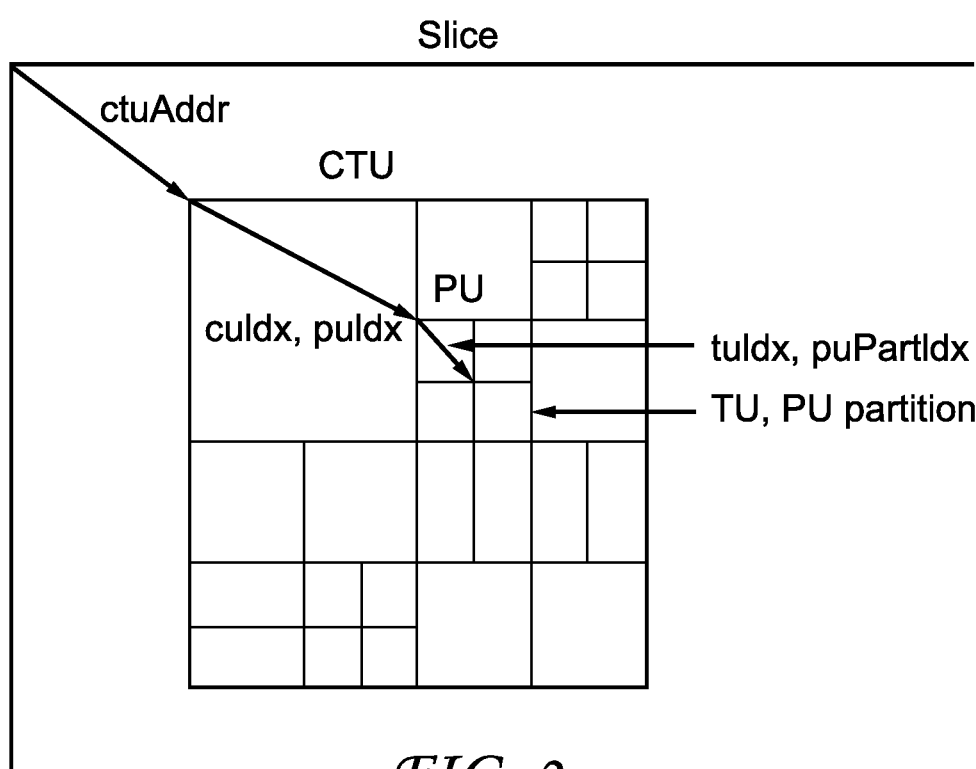
FIG. 2 shows an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
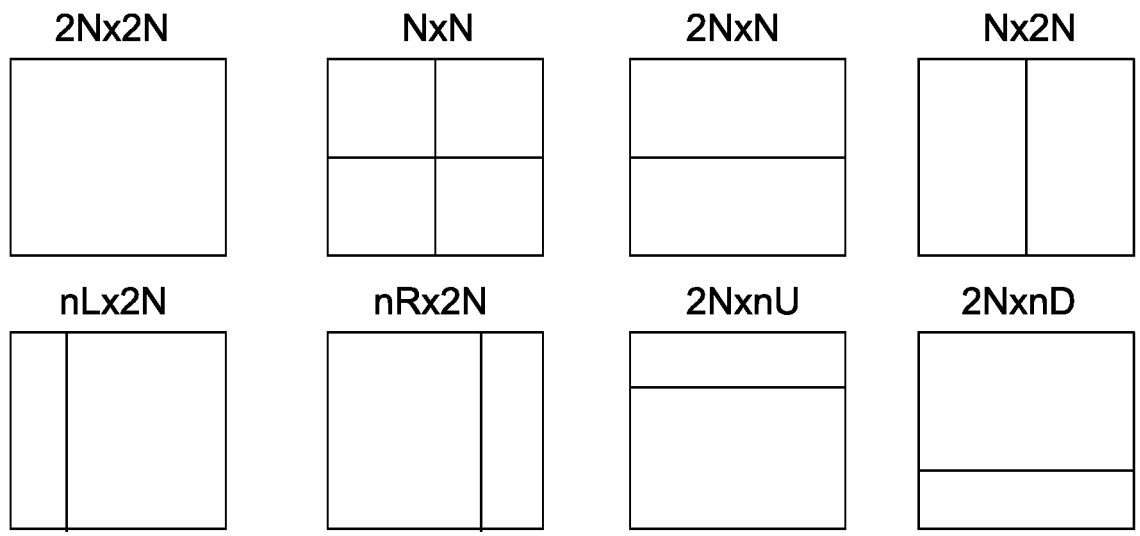
FIG. 3 shows an example of partitioning of coding units into prediction units.

The Partitioning of a Coding Unit into Prediction Unit(s) is done according to the partition type, signaled in the bit-stream. For Intra coding unit, only the partition types 2N×2N and N×N, illustrated on FIG. 3, are used. This means only square Prediction Units are used in Intra Coding Units.

On the contrary, Inter Coding Units can use all partition types shown on FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain as a proposal to represent picture data in a more flexible way in the compressed domain. The advantage of this flexible representation of the coding tree is that it provides increased compression efficiency compared to the CU/PU/TU arrangement of the HEVC standard.

Figure 4:
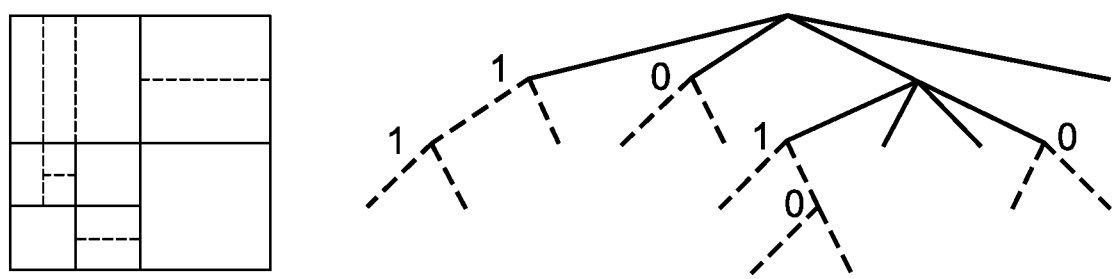
FIG. 4 shows an example quad-tree plus binary-tree coding tree unit representation.
Figure 5:
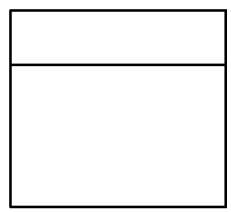
FIG. 5 shows examples of additional coding unit binary asymmetric splitting modes in QTBT+ACU.
Figure 5:
Figure 5:
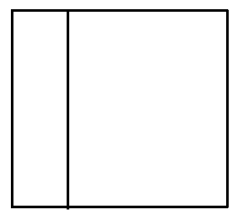
Figure 5:
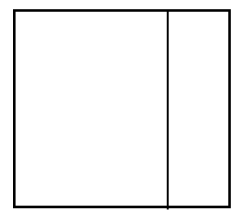

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit can be decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

- The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.
- In intra slices, the Luma and Chroma block partitioning structure is separated, and decided independently.
- No more CU partitioning into predictions units or transform units is employed. In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency compared to QTBT technology.

In another application, (Asymmetric Coding Units Codec Architecture, EP-IPA 16306308.4), it is proposed to introduce Coding Units with new rectangular shapes, which result from a new Binary Splitting Mode called asymmetric splitting mode.

This means new rectangular CU shapes are added. These new shapes consist in sizes equal to 3·2$^n$ in width and/or height. Furthermore, a CU with a size multiple of 3 in width or height can be further split in a binary fashion, horizontally or vertically.

As a consequence, a square coding unit with size (w,h) (width and height) that would be split through one of the proposed asymmetric binary splitting modes, for example HOR_UP (horizontal-up), would lead to 2 sub-coding units with respective rectangular sizes $$\left(w, \frac{h}{4}\right) \text{ and } \left(w, \frac{3h}{4}\right).$$

Figure 6:
FIG. 6 shows examples of coding structures chosen to encode an exemplary picture.
Figure 7:
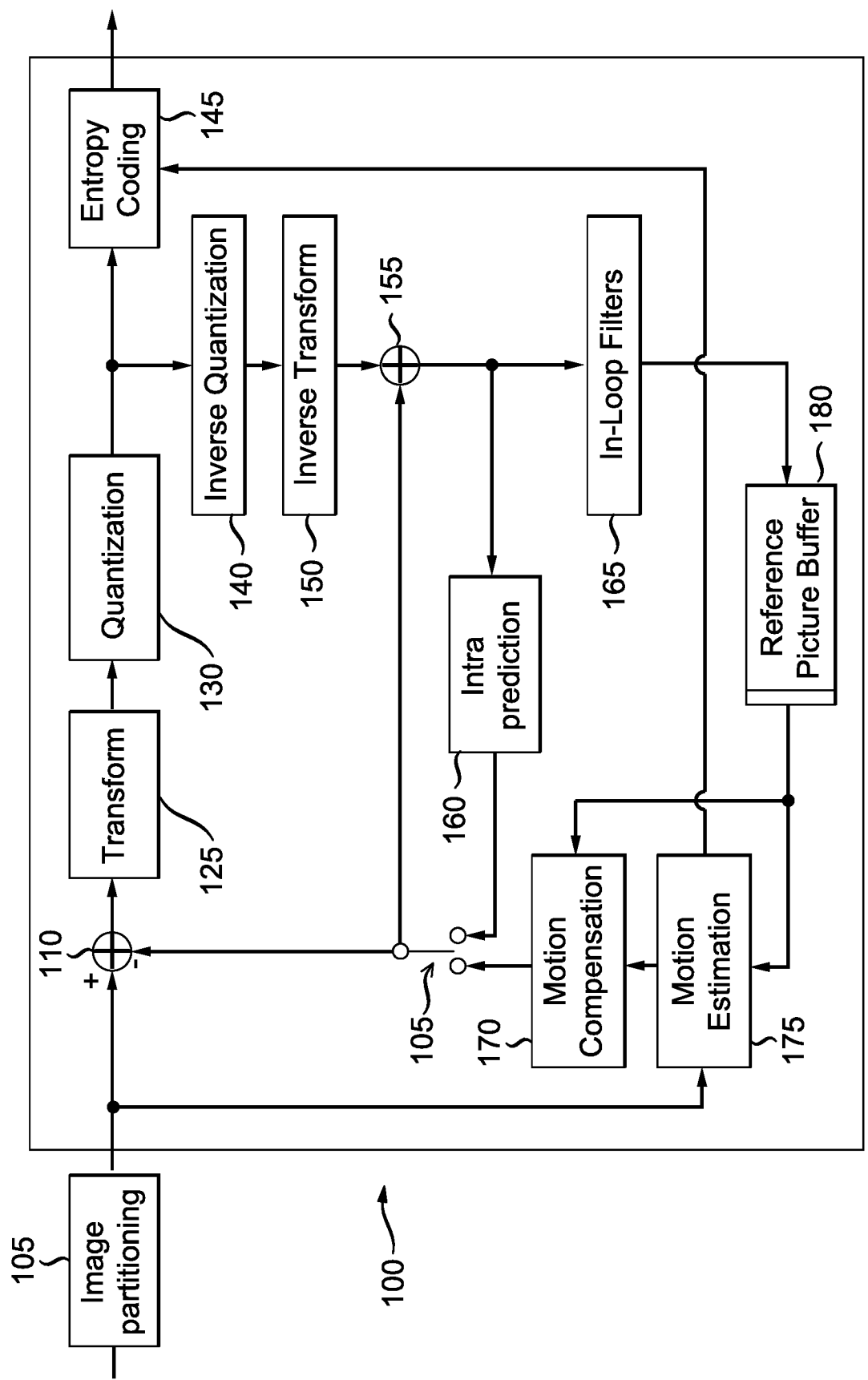
FIG. 7 shows a generic video compression scheme.
Figure 8:
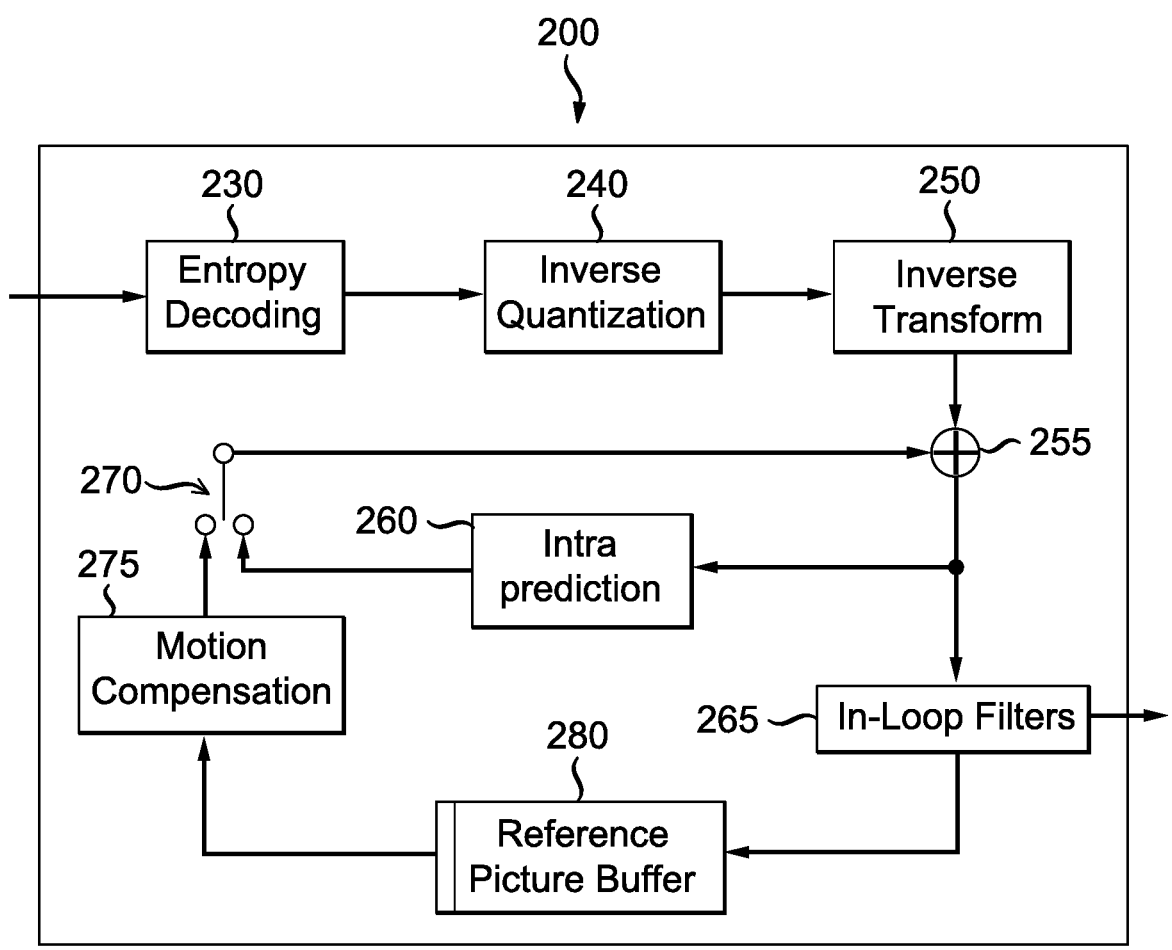
FIG. 8 shows a generic video decompression scheme.

FIG. 6 illustrates the coding units chosen by the encoder modified by another approach. One sees that asymmetric coding units are often used in this exemplary picture. One also notes that these additional coding unit topologies help in having coding structures that spatially match the structures and discontinuities contained in the original signal.

At least one embodiment proposes a modified coding framework where no transform of size that is a multiple of 3 is involved. This allows limiting the number of separable transform supported in the codec.

One advantage of at least one embodiment is that it reduces the amount of memory needed both on the encoder and decoder sides to store the transform basis function values associated to block size multiple of 3.

One problem solved by these embodiments is how to support the coding/decoding of Coding Units with a size equal to 3·2$^n$ in width and/or height, without computing a transform (e.g. a Discrete Cosine Transform, Discrete Sine Transform, etc.) with such size.

New transforms have been introduced in the codec to support the transform coding of new block sizes 3×2$^n$. This leads to a higher amount of memory needed to store the new transform basis functions values.

In another application, (Multiple Intra Partitions for Video Coding, EP-IPA 16305160.0), it is proposed to encode a rectangular block by sub-dividing it into smaller blocks called transform units, in such a way that each transform unit is spatially embedded in the rectangular block.

With respect to asymmetric CUs, a similar approach could be employed. This would consist in dividing a rectangular block into transform sub-blocks that have a size equal to a power of 2 in width or height. The drawback of such an approach is that dividing a block into several transform sub-blocks can reduce the coding efficiency, compared to using transform sizes equal to a rectangular block's size.

In the following parts of the document are provided several embodiments to support the coding/decoding of bocks with size equal to 3×2$^n$ in width and/or height, which are new compared to the cited prior art, and do not involve a transform with size 3×2$^n$.

The standard video coding module addressed by the described embodiments concerns the picture division into Coding Units (105), the transform (125) and inverse transform (150/250).

Figure 9:
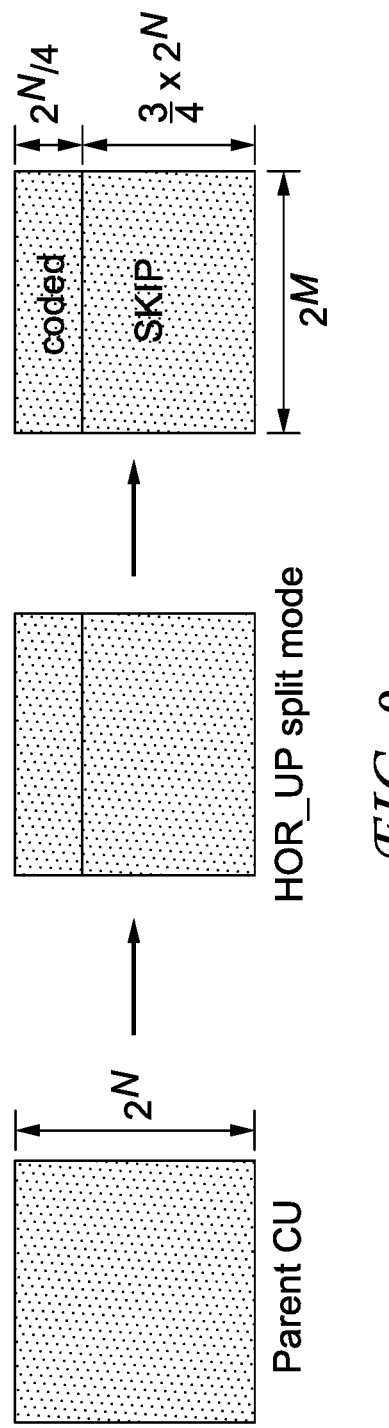
FIG. 9 shows an exemplary embodiment of one aspect of the described techniques.

The first embodiment consists in forcing a null residual in the blocks with a size for which it is desired to avoid performing a transform. This is illustrated on FIG. 9.

This takes the form of intra coded CU with a CBF syntax element equal to 0, which indicates that no non-zero transform coefficients are encoded for the considered block.

In a preferred variant, the cbf_luma, cbf_cb and/or cbf_cr syntax element for these block sizes is not coded into the bit-stream. Instead, the decoder infers that their value is equal to zero for these block sizes.

In the case of an INTER coding unit this embodiment takes one of the following forms:

- The cu_skip_flag syntax element associated to the CU is set to true systematically, for the CU size where one wants to avoid supporting a dedicated set of transforms. In a variant, the cu_skip_flag syntax element is not coded, and is inferred to be equal to false on the decoder side.
- The rqt_root_cbf flag associated to the CU is set to 0 on the encoder side, and is transmitted to the decoder. According to a variant, it is not transmitted, and is inferred to be 0 on the decoder side.
- The cbf_luma, cbf_cb and/or cbf_cr flags are set to 0, and are coded into the bit-stream. According to a variant, they are not transmitted and are inferred to be 0 on the decoder side.

According to a variant, all of the three above configurations are allowed, and the best one is chosen by the encoder through a rate distortion optimization process. The decoder parses the HEVC of JEM syntax to determine which of these configurations is used for a current CU.

This section presents the second proposed embodiment, which is coding/decoding the blocks with a size for which there is a desire to not support a dedicated transform. This block size is 3×2$^N$, since it results from an asymmetric splitting of the parent CU which has a size equal to a power of 2.

Figure 10:
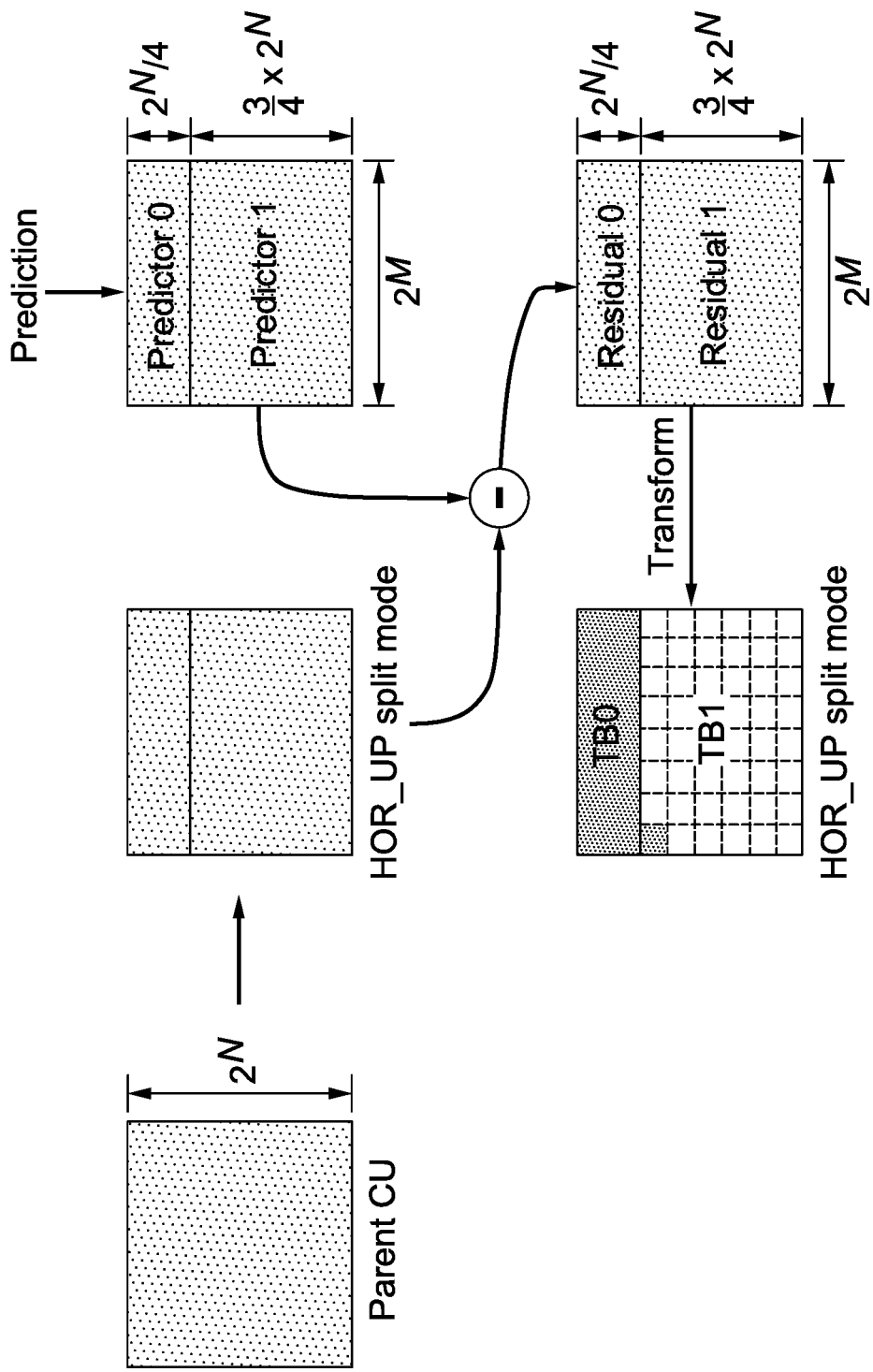
FIG. 10 shows a second exemplary embodiment of one aspect of the described techniques.

This embodiment is shown on FIG. 10, for an exemplary Coding Unit which is being divided asymmetrically in the horizontal direction (HOR_UP split mode). The main block partitioning, prediction, and transform steps that take place on the encoder side are shown. As can be seen, the residual 0 sub-block is processed normally, since it has a size equal to a power of 2 in vertical and horizontal directions. Thus, it leads to a transform block TB0 which is processed in a regular way through a 2D separable transform which size is a power of 2 in width and height.

On the contrary, concerning the residual associated to the block with size $3 \times 2^N$ with at most one transform coefficient, which is the DC coefficient.

Thus, in this embodiment, one block with size $3 \times 2^n$ is coded either with a null residual, or with a residual made of a single DC transform coefficient.

The advantage over the first embodiment is improved rate distortion performance, since it is possible to reduce the distortion of the considered block thanks to the partially coded residual. Another advantage is that it is not necessary to compute a full DCT transform for the block size $3 \times 2^n$. Indeed, computing the DC coefficient in the forward transform process simply consists in computing the average of the block, hence no specific treatment for the considered block size is needed. With respect to the inverse transform, the inverse transform and inverse quantization simply consist in a scaling operation since the transform block is made only of a DC coefficient.

Thus this embodiment solves one problem introduced above.

Figure 11:
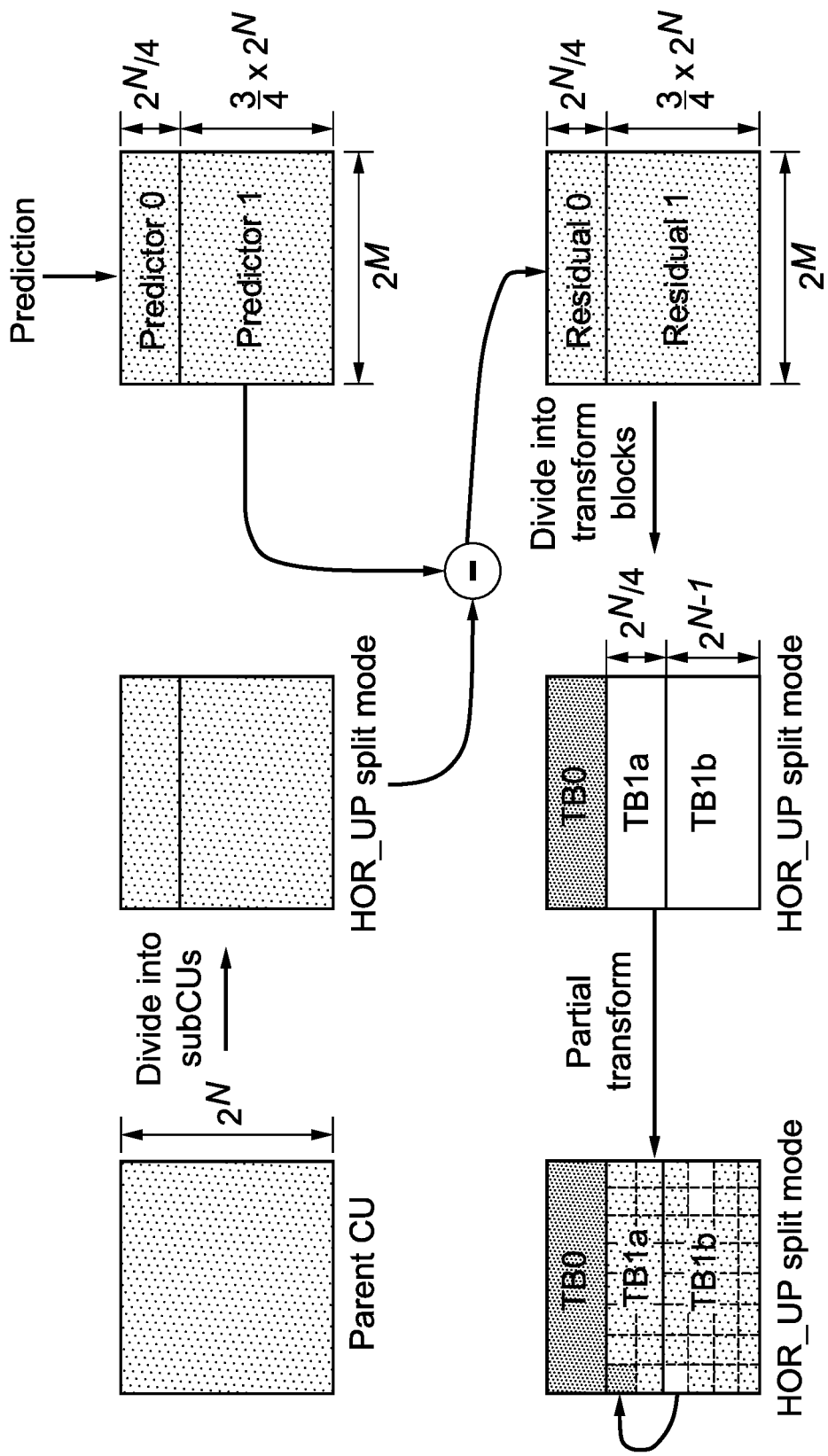
FIG. 11 shows a first variant of a third exemplary embodiment of one aspect of the described techniques.

The third embodiment to handle a block with size $3 \times 2^n$ without performing a transform with such size is shown on FIG. 11. This embodiment consists in a more advanced version of the second embodiment. It consists in computing a single DC transform coefficient for the whole block noted "Residual 1" on FIG. 11.

This single DC coefficient is shown in dark grey on the bottom left part of FIG. 11. Moreover, the block "Residual 1" is divided into 2 sub-blocks, called transform blocks, noted TB1a and TB1b. This division is such that the two resulting transform blocks have a size equal to a power of 2 in width and size. As shown in the bottom middle of FIG. 11, if the parent Coding Unit has a size $2^N$ in the considered direction, then the "Residual 1" sub-CU has a size $2 \times 2^N$ in that direction. Hence, the two transform blocks have a size respectively equal to $$\frac{2^N}{4} = 2^{N-2}$$

and $2^{N-1}$. This makes it possible to compute AC coefficients associated to each transform block TB1a and TB1b, through already existing transforms with sizes $2^{N-2}$ and $2^{N-1}$. To do so, the common DC coefficient is reconstructed in the spatial domain. Then this partially reconstructed block is subtracted from the block "Residual 1", then two partial transforms are applied on each block TB1a and TB1b to generate the AC coefficients respectively associated to these two transform blocks.

On the decoder side, the reconstruction process of the texture block "Residual 1" comprises the following steps:
  Obtain the DC coefficient of the whole sub-CU by entropy decoding the transform coefficient associated to transform block TB1a.
  Reconstruct the low-pass component of the "Residual 1" block, through inverse quantization and inverse transform applied on this single DC coefficient.
  Apply a partial inverse transform of block TB1a, by applying the inverse transform on its AC coefficient and considering a zero DC coefficient.
  Entropy decode the AC coefficient associated to transform block TB1b.
  Partially inverse transform the transform block TB1b, by applying the appropriate inverse transform on its AC coefficients, and considering a DC coefficient equal to zero.

Figure 12:
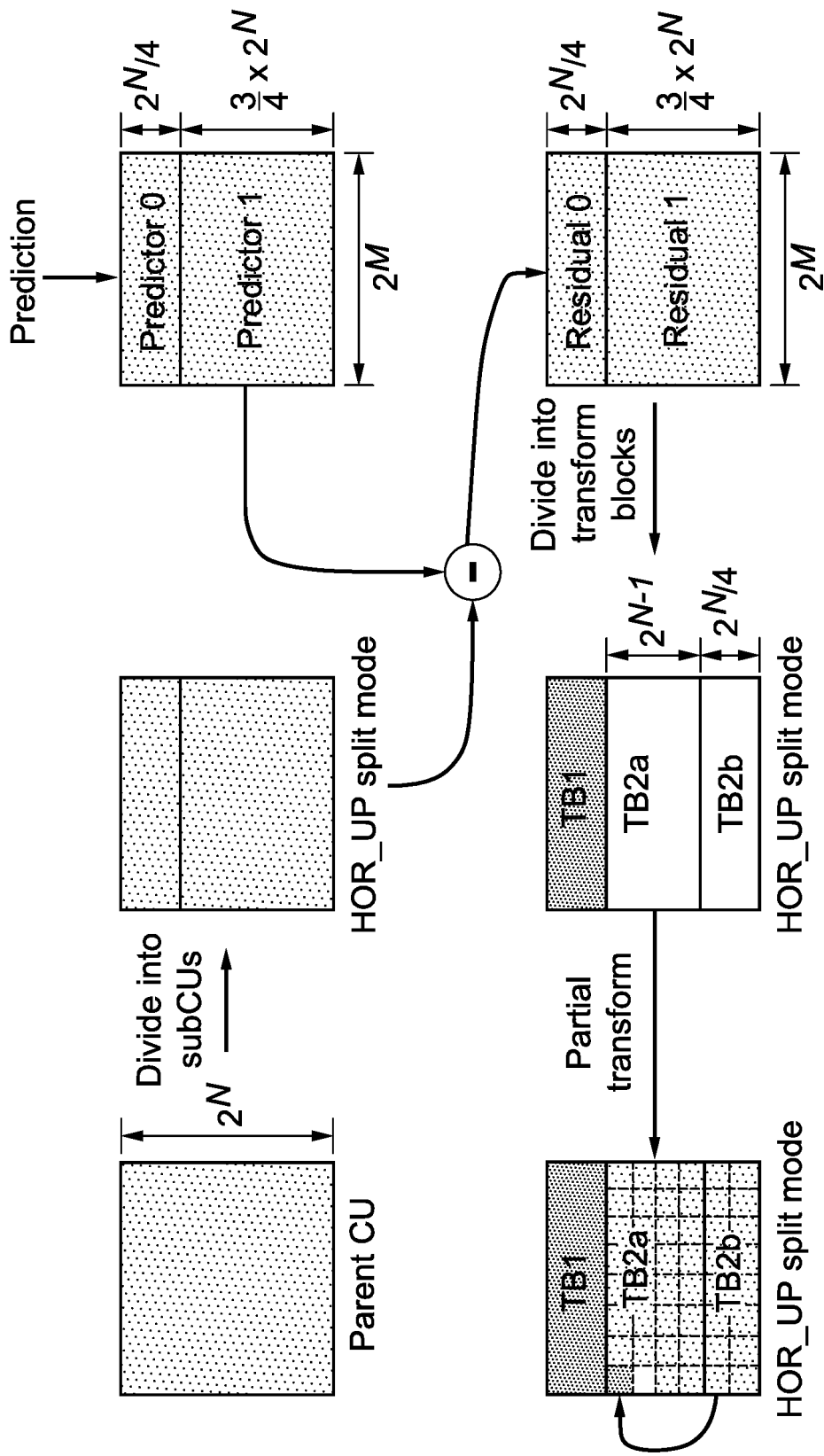
FIG. 12 shows a second variant of a third exemplary embodiment of one aspect of the described techniques.

FIG. 12 is a second variant of the third embodiment, where the spatial division of the "Residual 1" block into transform blocks TB1a and TB1b is different from that of FIG. 11. Here TB1a has a size $2^{N-1}$ and sub-block TB1b has a size $2^{N-2}$ in the vertical direction.

The advantage of the third embodiment is that it further improves the compression efficiency of the codec compared to the embodiment 2, since it allows to encode a block with size $3 \times 2^n$ in one direction with a quality level as good as desired.

Thus, it is a further refinement to embodiments 1 and 2, where, in addition to skip mode and single DC coefficient configuration for block size $3 \times 2^n$, it is possible to encode AC coefficients for such block size.

Compared to the prior art where a transform tree is used to generate Transform Units smaller than the considered CU, the embodiment 2 also improves the coding efficiency, through "factorizing" the DC coefficient. Indeed, it only encodes one DC coefficient for a set of two transform blocks.

The fourth and last embodiment is presented in this section. The basic idea is to exploit the separable property of the two-dimensional (2D) transform employed. Indeed, the 2D transform is computed through the successive application of a one-dimensional (1D) transform in one direction, then another 1D transform in the other direction.

Thus, in case the block has a size $3 \times 2^n$ in one direction but has a size $2^m$ in the other direction, then it is possible to divide the residual block into 2 transform sub-block, but only to compute the 1D transform in one direction. In the other direction (with size $2^m$) it is possible to apply a transform with size $2^m$ over the whole block "Residual 1" without splitting it into two spatial sub-parts.

Figure 13:
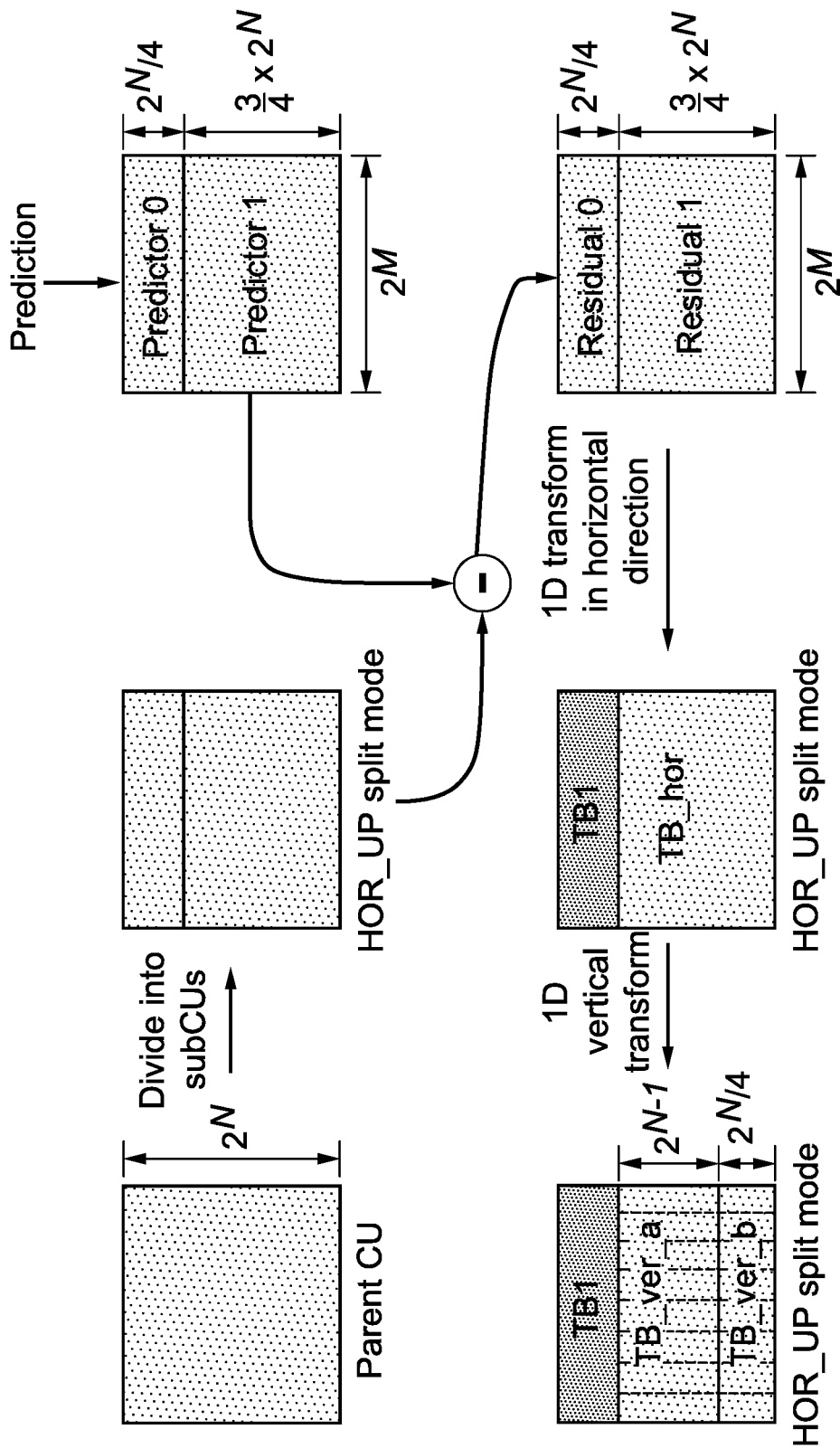
FIG. 13 shows a fourth exemplary embodiment of one aspect of the described techniques.

This is illustrated in FIG. 13. As can be seen, on this example, the horizontal transform is performed over the entire Residual block, since its size is equal to $2^M$ in that direction. Thus, a classical transform with size $2^M$ can be used in that direction.

On the contrary, the exemplary block is of size $\frac{3}{4} \cdot 2^N$ in the vertical direction. Thus, it is proposed to employ two 1D sub-transforms with respective sizes $2^{N-2}$ and $2^{N-1}$ for that direction. This is illustrated on the bottom-left part of FIG. 13, where 2 sub-blocks are formed (TB_ver_a and TB_ver_b), only to perform the vertical transform of the entire asymmetric block "Residual 1".

Figure 14:
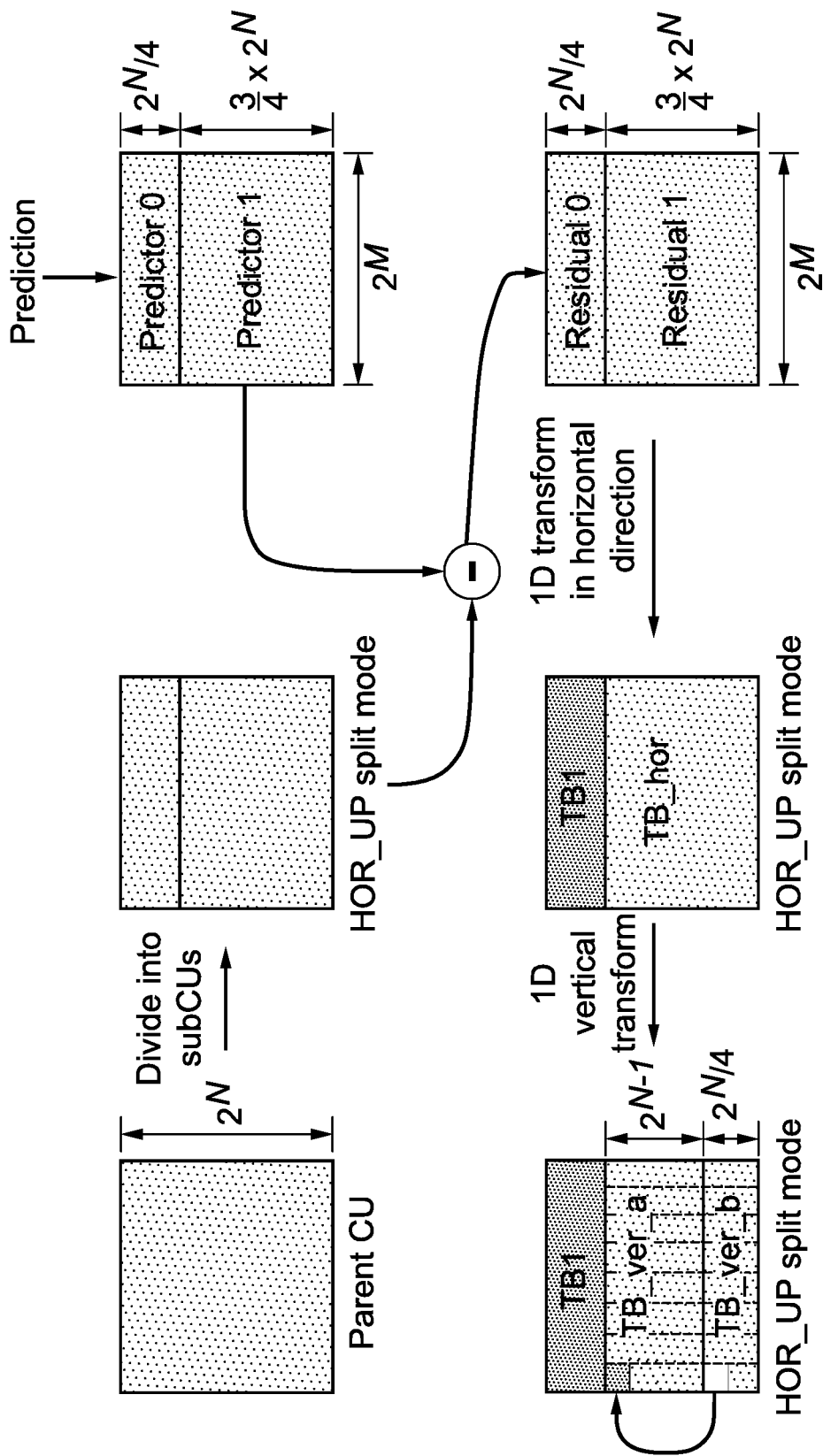
FIG. 14 shows a second variant of the fourth exemplary embodiment of one aspect of the described techniques.

FIG. 14 shows a variant of the embodiment 4. This is the same embodiment as that of FIG. 13, except that a single DC coefficient is shared among the two transform sub-blocks TB_ver_a and TB_ver_b.

Figure 15:
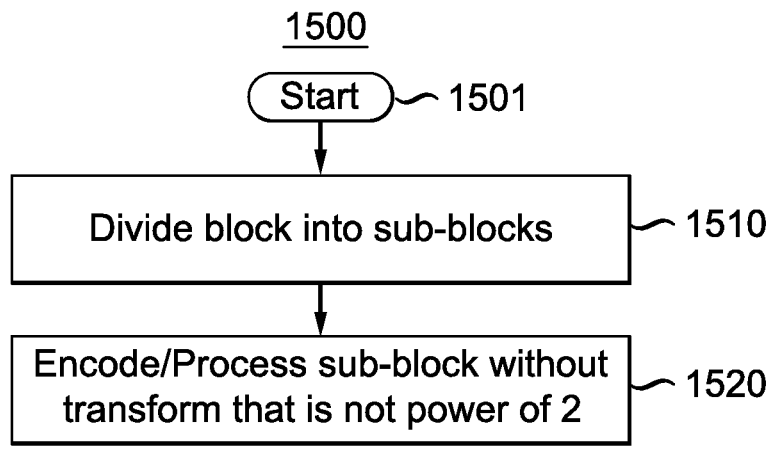
FIG. 15 shows one embodiment of a method for coding a video block using one general aspect described herein.

FIG. 15 shows one embodiment of a method 1500 for coding a block of video data. The method commences at Start block 1501 and proceeds to block 1510 for dividing the block into at least two rectangular sub-blocks. Control proceeds from block 1510 to block 1520 for encoding a sub-block having size that is not a power-of-two in width or height, using processing such that a transform that is not a power-of-two is not needed.

Figure 16:
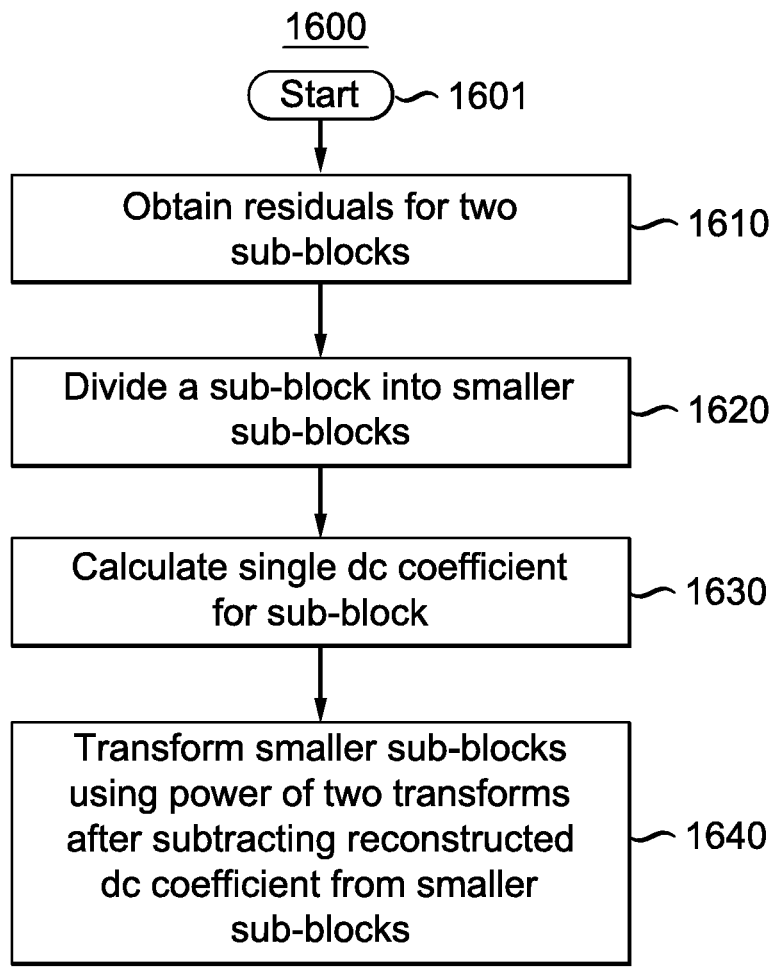
FIG. 16 shows another embodiment of a method for coding a video block using one general aspect described herein.

FIG. 16 shows another embodiment of a method 1600 for coding a block of video data. The method commences at Start block 1601 and proceeds to block 1610 for obtaining residuals for the at least two sub-blocks using at least two corresponding predictor sub-blocks. Control proceeds from block 1610 to block 1620 for dividing one sub-block of the at least two sub-blocks into at least two smaller sub-blocks.

Control then proceeds from block 1620 to block 1630 for calculating a single DC coefficient for the one sub-block of the at least two sub-blocks. Control then proceeds from block 1630 to block 1640 for transforming each of the smaller sub-blocks using power-of-two sized transforms to generate transform coefficients after subtracting a reconstructed version of the single DC coefficient from each the smaller sub-block, wherein the single DC coefficient is included in the transform coefficients of one of the smaller sub-blocks.

Figure 17:
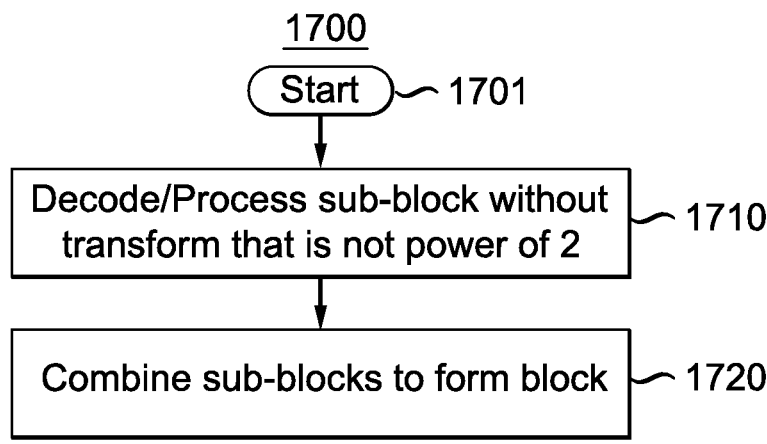
FIG. 17 shows one embodiment of a method for decoding a video block using one general aspect described herein.

FIG. 17 shows one embodiment of a method 1700 for decoding a block of video data. The method commences at Start block 1701 and proceeds to block 1710 for decoding a sub-block having size that is not a power-of-two in width or height, using processing such that an inverse transform that is not a power-of-two is not needed. Control then proceeds from block 1710 to block 1720 wherein the at least two rectangular sub-blocks are combined into a block.

Figure 18:
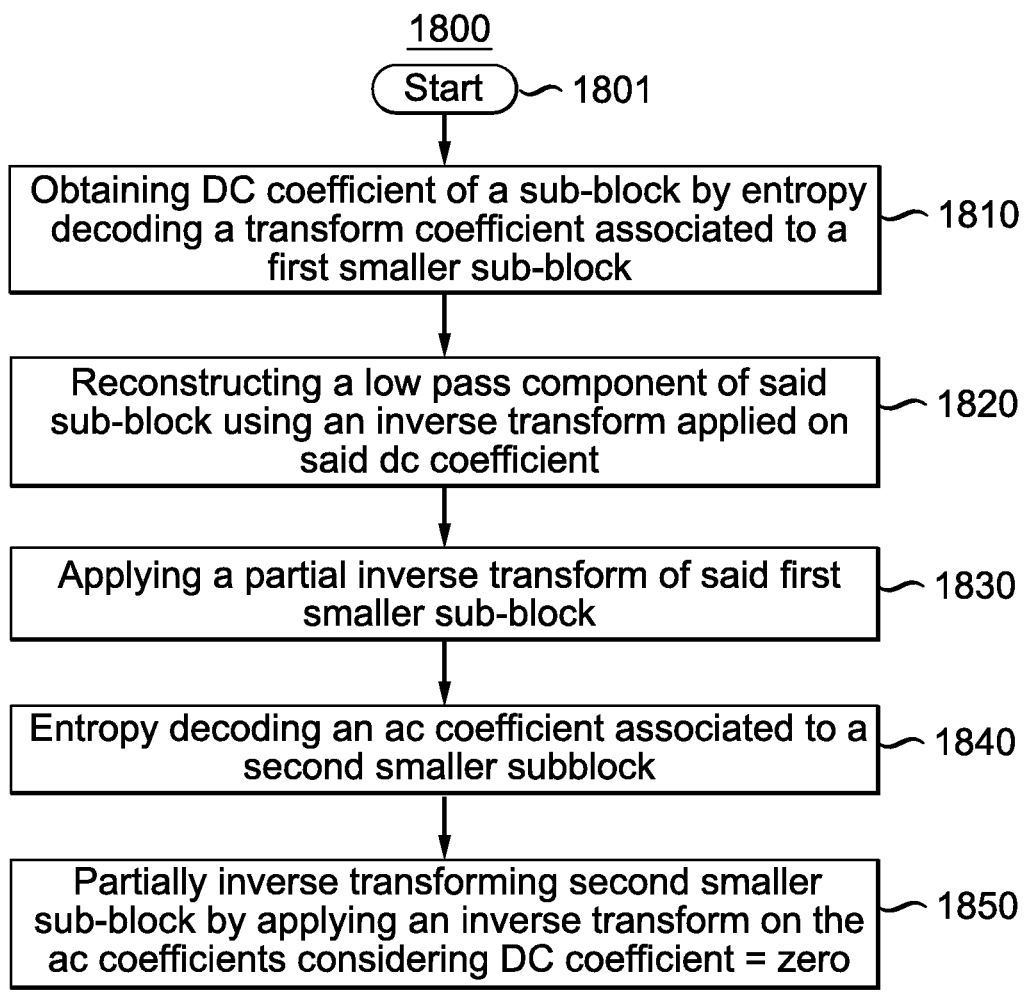
FIG. 18 shows another embodiment of a method for decoding a video block using one general aspect described herein.

FIG. 18 shows another embodiment of a method 1800 for decoding a block of video data. The method commences at Start block 1801 and proceeds to block 1810 for obtaining a DC coefficient of a sub-block having size that is not a power-of-two in width or height by entropy decoding a transform coefficient associated to a first smaller sub-block that comprises the sub-block. Control then proceeds from block 1810 to block 1820 for reconstructing a low pass component of the sub-block using an inverse transform applied on the DC coefficient. Control then proceeds from block 1820 to block 1830 for applying a partial inverse transform of the first smaller sub-block by applying an inverse transform on AC coefficients of the first smaller sub-block and considering a DC coefficient equal to zero. Control then proceeds from block 1830 to block 1840 for entropy decoding an AC coefficient associated to a second smaller sub-block of the sub-block. Control then proceeds from block 1840 to block 1850 for partially inverse transforming the second smaller sub-block by applying an inverse transform on the AC coefficients of the second smaller sub-block and considering a DC coefficient equal to zero.

Figure 19:
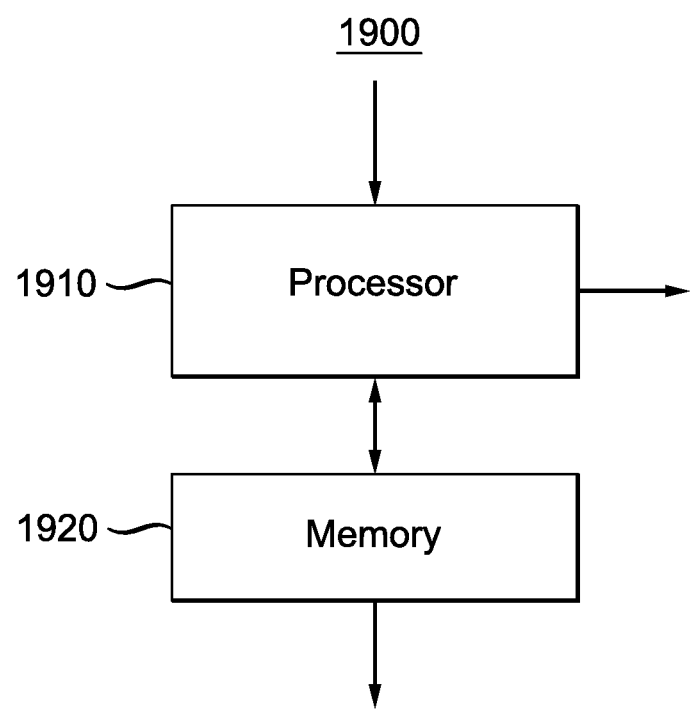
FIG. 19 shows one embodiment of an apparatus using at least one general aspect described herein.

FIG. 19 shows one embodiment of an apparatus 1900 for coding or decoding a block of video data. The apparatus comprises Processor 1910 which has input and output ports and is in signal connectivity with Memory 1920, also having input and output ports. The apparatus can execute any of the aforementioned method embodiments, or variations.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for decoding a block of video data, comprising:
   decoding a sub-block having size that is not a power-of-two in width or height, using processing such that an inverse transform that is not a power-of-two is not needed, wherein said sub-block was divided from said block into at least two rectangular sub-blocks, wherein, said processing comprises:
   obtaining a DC coefficient of a sub-block having size that is not a power-of-two in width or height by entropy decoding a transform coefficient associated with a first smaller sub-block that comprises said sub-block;
   reconstructing a low pass component of said sub-block using an inverse transform applied on said DC coefficient;

applying a partial inverse transform of said first smaller sub-block by applying an inverse transform on AC coefficients of the first smaller sub-block and considering a DC coefficient equal to zero;
entropy decoding an AC coefficient associated with a second smaller sub-block of said sub-block;
partially inverse transforming said second smaller sub-block by applying an inverse transform on the AC coefficients of said second smaller sub-block and considering a DC coefficient equal to zero.

2. A method for coding a block of video data, comprising:
encoding a block comprising at least two rectangular sub-blocks, using processing such that a transform that is not a power-of-two is not needed, wherein, said processing comprises:
obtaining residuals for the block using interprediction;
dividing said residuals for the block into at least two sub-blocks comprising at least one sub-block having a dimension that is not a power-of-two;
replacing residuals for the at least one sub-block having a dimension that is not a power-of-two by zeros;
transforming each remaining sub-block using power-of-two sized transforms to generate transform coefficients.

3. The method of claim 2, wherein a sub-block having a dimension that is not a power of two is a multiple of a power-of-two.

4. The method of 3, wherein said sub-block having a dimension that is not a power of two is three times a power-of-two.

5. The method of claim 2, further comprising encoding at least one syntax element indicative of at least one sub-block having residuals replaced by zeros.

6. The method of claim 2, wherein said processing further comprises using SKIP mode for said sub-block having dimension that is not a power-of-two.

7. The method of claim 2, wherein said processing comprises:
transforming said sub-block having dimension that is not a power-of-two using a one dimensional transform in a first direction;
transforming said sub-block having dimension that is not a power-of-two using a one dimensional transform in a second direction.

8. An apparatus for coding a block of video data, comprising:
a memory, and
a processor, configured to:
encode a block comprising at least two rectangular sub-blocks, using processing such that a transform that is not a power-of-two is not needed, wherein, said processing comprises:
obtaining residuals for the block using interprediction;
dividing said residuals for the block into at least two sub-blocks comprising at least one sub-block having a dimension that is not a power-of-two;
replacing residuals for the at least one sub-block having a dimension that is not a power-of-two by zeros;
transforming each remaining sub-block using power-of-two sized transforms to generate transform coefficients.

9. The apparatus of 8, wherein said sub-block having a dimension that is not a power of two is three times a power-of-two.

10. The apparatus of claim 8, further comprising encoding at least one syntax element indicative of at least one sub-block having residuals replaced by zeros.

11. The apparatus of claim 8, wherein said processor is further configured to:

transform said sub-block having dimension that is not a power-of-two using a one dimensional transform in a first direction;
transform said sub-block having dimension that is not a power-of-two using a one dimensional transform in a second direction.

12. A method for decoding a block of video data, comprising:
decoding a block comprising at least two rectangular sub-blocks, using processing such that an inverse transform that is not a power-of-two is not needed, wherein, said processing comprises:
applying an inverse transform on coefficients of a first sub-block by applying a power-of-two sized inverse transform to generate residuals for the first sub-block;
inserting zeros for residuals in a second sub-block having a dimension that is not a power-of-two;
reconstructing residuals of the first sub-block and second sub-block that comprise the block.

13. The method of claim 12, wherein a sub-block having a dimension that is not a power of two is a multiple of a power-of-two.

14. The method of 13, wherein said sub-block having a dimension that is not a power of two is three times a power-of-two.

15. The method of claim 12, further comprising decoding at least one syntax element indicative of at least one sub-block having residuals replaced by zeros.

16. The method of claim 12, wherein said processing further comprises using SKIP mode for said sub-block having dimension that is not a power-of-two.

17. The method of claim 12, wherein said processing comprises:
inverse transforming said sub-block having dimension that is not a power-of-two using a one dimensional inverse transform in a first direction;
inverse transforming said sub-block having dimension that is not a power-of-two using a one dimensional inverse transform in a second direction.

18. An apparatus for decoding a block of video data, comprising:
a memory, and
a processor, configured to:
decode a block comprising at least two rectangular sub-blocks, using processing such that an inverse transform that is not a power-of-two is not needed, wherein, said processing comprises:
applying an inverse transform on coefficients of a first sub-block by applying a power-of-two sized inverse transform to generate residuals for the first sub-block;
inserting zeros for residuals in a second sub-block having a dimension that is not a power-of-two;
reconstructing residuals of the first sub-block and second sub-block that comprise the block.

19. The apparatus of claim 18, wherein said sub-block having a dimension that is not a power of two is three times a power-of-two.

20. The apparatus of claim 18, further comprising decoding at least one syntax element indicative of at least one sub-block having residuals replaced by zeros.

21. The apparatus of claim 18, wherein said processor is further configured to:

inverse transform said sub-block having dimension that is not a power-of-two using a one dimensional inverse transform in a first direction;

inverse transform said sub-block having dimension that is not a power-of-two using a one dimensional inverse transform in a second direction.

\* \* \* \* \*